United States Patent
Wagner et al.

(10) Patent No.: US 12,311,318 B2
(45) Date of Patent: May 27, 2025

(54) POTTING PROCESS AND APPARATUS

(71) Applicant: GAMBRO LUNDIA AB, Lund (SE)

(72) Inventors: Steffen Wagner, Meßstetten (DE); Christof Beck, Bitz (DE); Tobias Bauer, Altdorf-Hellershof (DE); Leon Klinger, Albstadt-Ebingen (DE)

(73) Assignee: GAMBRO LUNDIA AB, Lund (SE)

( * ) Notice: Subject to any disclaimer, the term of this patent is extended or adjusted under 35 U.S.C. 154(b) by 305 days.

(21) Appl. No.: 18/001,977

(22) PCT Filed: Jun. 15, 2021

(86) PCT No.: PCT/EP2021/066037
§ 371 (c)(1),
(2) Date: Dec. 15, 2022

(87) PCT Pub. No.: WO2021/254992
PCT Pub. Date: Dec. 23, 2021

(65) Prior Publication Data
US 2023/0233998 A1    Jul. 27, 2023

(30) Foreign Application Priority Data

Jun. 16, 2020 (EP) .................................... 20180215

(51) Int. Cl.
*B01D 63/02* (2006.01)
(52) U.S. Cl.
CPC ....... *B01D 63/0222* (2022.08); *B01D 63/023* (2013.01); *B01D 2313/201* (2022.08)
(58) Field of Classification Search
CPC .............. B01D 63/0222; B01D 63/023; B05C 17/00566
See application file for complete search history.

(56) References Cited

U.S. PATENT DOCUMENTS

| | | | | |
|---|---|---|---|---|
| 4,230,665 A | * | 10/1980 | Huber | G01N 21/3103 73/864.22 |
| 2004/0074833 A1 | * | 4/2004 | Nakamatsu | B01D 63/022 210/321.81 |
| 2015/0168373 A1 | * | 6/2015 | Volker | G01N 21/27 422/68.1 |
| 2018/0356325 A1 | * | 12/2018 | Cho | G01N 11/06 |
| 2019/0037969 A1 | * | 2/2019 | Busbee | B01F 27/092 |

FOREIGN PATENT DOCUMENTS

| | | | | |
|---|---|---|---|---|
| CA | 1245166 | | 11/1988 | |
| CN | 110325674 A | * | 10/2019 | ............. D01D 5/003 |
| EP | 3479890 | | 5/2019 | |
| EP | 3620228 | | 3/2020 | |
| GB | 2016358 | | 9/1979 | |
| WO | WO2008/402486 | | 7/1984 | |

OTHER PUBLICATIONS

English Translation of CN110325674 (Year: 2024).*
PCT Search Report and Written Opinion prepared for PCT Application No. PCT/EP2021/066037, completed Sep. 7, 2021.

* cited by examiner

*Primary Examiner* — James M Mellott
*Assistant Examiner* — Keran V Nguyen
(74) *Attorney, Agent, or Firm* — Barnes & Thornburg LLP

(57) ABSTRACT

The present disclosure relates to a process and an apparatus for potting hollow fiber membranes in a diffusion and/or filtration device, e.g., an ultrafilter or a capillary dialyzer.

7 Claims, 3 Drawing Sheets

POTTING PROCESS AND APPARATUS

CROSS-REFERENCE TO RELATED APPLICATIONS

This application is a national stage entry under 35 U.S.C. § 371 (b) of PCT International Application No. PCT/EP2021/066037, filed Jun. 15, 2021, which claims the benefit of European Patent Application Serial No. 20180215.4, filed on Jun. 16, 2020, the entire disclosures of both of which are incorporated herein by reference.

TECHNICAL FIELD

The present disclosure relates to a process and an apparatus for potting hollow fiber membranes in a diffusion and/or filtration device, e.g., an ultrafilter or a capillary dialyzer.

DESCRIPTION OF THE RELATED ART

Diffusion and/or filtration devices comprising hollow fiber membranes are widely used for separation or purification of liquids. Examples are ultrafilters used for water purification; plasma filters for the separation of plasma from blood; capillary dialyzers for blood purification in patients suffering from renal insufficiency, i.e., for treatment of the patients by hemodialysis, hemodiafiltration or hemofiltration; etc. A multitude of different models of diffusion and/or filtration devices comprising hollow fiber membranes is commercially available.

The devices generally consist of a housing comprising a tubular section with end caps capping the mouths of the tubular section. A bundle of hollow fiber membranes is arranged in the housing in a way that a seal is provided between a first flow space formed by the fiber cavities and a second flow space surrounding the membranes on the outside. The seal generally is provided by end wall means within the housing formed by a polymer mass in which the ends of the hollow fiber membranes are embedded.

GB 2016358 A describes a method of potting the ends of a hollow fiber bundle in a hollow fiber dialyzer. The method comprises inserting the bundle in a tubular casing, closing the ends of the casing with closure members, providing curable liquid sealant in the casing, spinning the casing to cause the sealant to spread itself around the ends of the hollow fibers, allowing the sealant to set, and then removing the closure members and cutting through the ends of the fibers and the sealant, or alternatively cutting through the closure members instead of removing them.

WO 1984/002486 A1 discloses another method for making a hollow fiber separation device which includes the steps of forming an integral structure which comprises at least one tubular housing portion; and an elongated chamber portion extending in elongated relation to the tubular housing portion and communicating with the housing portion adjacent opposed ends thereof. An aperture is provided in a central area of the elongated chamber. Hollow fibers for diffusion are introduced into the housing and the ends of the housing portion are closed. The structure is spun on an axis between the ends, and potting compound is added to the chamber portion through the aperture. The potting compound migrates radially outwardly through the chamber to the closed ends of the housing portion, to encase the ends of the hollow fibers in the potting compound. After curing of the potting compound, the ends of the tubular housing portion are transversely cut to expose open bores of the hollow fibers, and flow manifold end cap members are applied to the cut tubular housing ends.

EP 3 620 228 A1 discloses a process for making a filtration and/or diffusion device comprising a bundle of hollow fiber membranes in a tubular housing. The process involves sealing the ends of the fibers and the mouths of the tubular housing with a thermoplastic resin.

CA 1 245 166 A discloses a blow molded side port for a hollow fiber separation device. The side port is made of plastic material and defines an outwardly extending annular shoulder portion to receive and seat an annular connector seal of a mating connector. A first annular encircling channel positioned about said side port is proportioned to receive retention member means from the mating connector, and a second annular encircling channel is positioned about said side port at a position between the first annular channel and the shoulder portion to stiffen said side port. The second channel is of less depth than the first channel to avoid an apparently locked configuration between the side port and the mating connector when the retention members project into the second channel.

EP 3 479 890 A1 discloses a hollow fiber membrane with a tubular body, a cap, a hollow fiber membrane, and an end seal portion, wherein at least a liquid contacting portion of the end seal portion is sealed with a cured epoxy resin.

Polyurethane resin is commonly used as potting compound or curable liquid sealant. Isocyanate and polyol are dosed into a mixer, e.g., a mixing head, and the reacting mixture is introduced into the housing of the diffusion and/or filtration device via a disposable manifold. As small amounts of the polyurethane resin remain in the mixing unit and on the surfaces of the manifold and form incrustations upon curing of the resin, it is necessary to regularly flush the mixing unit and to replace the disposable manifold.

It is an objective of the present disclosure to provide a potting process which is more efficient and generates less waste.

SUMMARY

The present disclosure provides a process and a device for potting hollow fiber membranes in a diffusion and/or filtration device.

An isocyanate component and a polyol component are dosed into a tubular fluid port of a housing of a diffusion and/or filtration device and mix in a recess provided on the inner wall of the fluid port to form a reacting polyurethane mixture.

The diffusion and/or filtration device is rotated around a central axis which is perpendicular to the longitudinal axis of the housing, thereby transporting the reacting polyurethane mixture towards an end of the housing where the polyurethane mixture sets and forms an end wall.

The device of the present disclosure comprises two capillaries arranged at an angle relative to one another, the mouths of the capillaries being arranged at a distance from each other. One of the capillaries is connected to a reservoir comprising an isocyanate component, the other capillary is connected to a reservoir comprising a polyol component. Each of the two capillaries is also connected to a metering device for dosing the required amount of polyol component and isocyanate component, respectively, into a fluid port of a housing of a diffusion and/or filtration device.

The present disclosure also provides a tubular housing of a diffusion and/or filtration device featuring two tubular fluid ports located on the outer wall of the tubular housing at equal distance from the mouths of the tubular housing, the inner wall surface of each of the tubular fluid ports featuring a recess. The recess is used to form a reactive polyurethane mixture from a first stream of an isocyanate component and a second stream of a polyol component.

DETAILED DESCRIPTION

Figure 1:
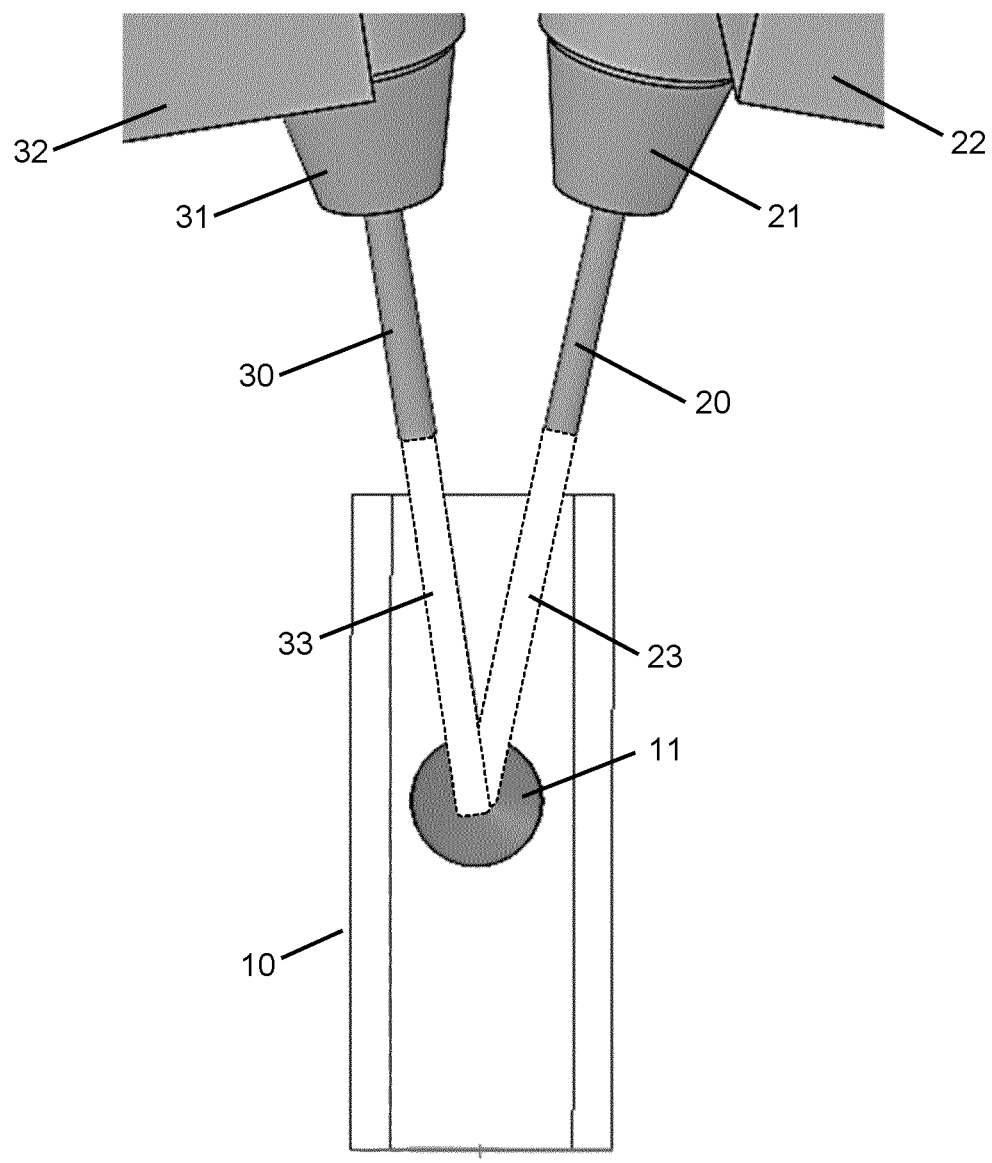
FIG. 1 is a schematic front view of a tubular fluid port of the present disclosure featuring a recess on its inner wall surface; and of two capillaries for dosing polyurethane components into the tubular fluid port.

The present disclosure provides a process and a device for potting hollow fiber membranes in a diffusion and/or filtration device.

The present disclosure provides a process for potting hollow fiber membranes in a diffusion and/or filtration device comprising a tubular housing with a bundle of hollow fiber membranes arranged therein and at least one tubular fluid port located on the outer wall surface of the tubular housing.

The process comprises the steps of
a) dosing simultaneously, but separate from each other, a polyol component and an isocyanate component into a recess provided on an inner wall of the at least one tubular fluid port;
b) allowing the polyol component and the isocyanate component to mix in the recess, forming a polyurethane reaction mixture;
c) causing the polyurethane reaction mixture to flow towards a mouth of the tubular housing which has been closed with a potting lid; and to embed the ends of the bundle of hollow fibers in the polyurethane reaction mixture; and
d) allowing the polyurethane reaction mixture to cure and foam a solid potting zone sealing the mouth of the tubular housing.

In the process of the present disclosure, a polyol component and an isocyanate component are dosed into a tubular fluid port (generally called a "Hansen" connector) of a housing of the diffusion and/or filtration device simultaneously, but separate from each other, and mix in a recess provided on the inner wall of the tubular fluid port.

Except for the inner wall of the tubular fluid port, no parts of the dosing apparatus get into contact with the mixture. Consequently, no parts of the dosing apparatus will be contaminated with polyurethane residues. A separate mixing unit, such as a rotating mixer, is not necessary any more. Consequently, no cleaning of mixing units involving flushing steps is required either. Moreover, no disposable manifolds are used in the potting process.

In one embodiment of the process, the polyol component and the isocyanate component are separately dosed into the tubular fluid port through two capillaries. The capillaries neither contact each other nor the inner wall of the tubular fluid port.

In one embodiment of the process, the fluids flowing from the two capillaries form two liquid jets which meet in the recess provided on the inner wall of the tubular fluid port.

The two liquid jets are directed towards each other. In one embodiment, the capillaries form an angle in the range of from 5° to 30°, for instance, from 10° to 25°, or from 15° to 20°. In one embodiment, the liquid jets form an angle with the inner wall surface of the tubular fluid port in the range of from 15° to 45°, for instance, from 15° to 30°, or from 15° to 25°.

In general, the volumetric flow rate of the liquid will not be the same for both capillaries. The volumetric flow rate has to be adjusted according to the stoichiometry of the polyurethane to be produced. In an exemplary embodiment, the volume ratio of polyol component to isocyanate component is 100:(66±5). Therefore, the volumetric flow rate of the isocyanate component has to be about ⅔ of the volumetric flow rate of the isocyanate component.

In one embodiment, the recess has a cylindrical cross-section. In a further embodiment, the recess is tapered. In another embodiment, the recess takes the form of a spherical segment, e.g., a hemisphere. In yet another embodiment, the recess has a polygonal cross-section, for instance, a rectangular or hexagonal cross-section. In other words, the form of the recess is selected from the group consisting of a cylinder, a cone, a spherical segment, a polygonal prism, and a polygonal pyramid.

In a further embodiment, the longitudinal axis of the recess forms an acute angle with the inner wall surface of the tubular fluid port, for instance, an angle in the range of from 30° to 60°, e.g., 45°. The longitudinal axis of the recess is the central axis extending from the center of the bottom of the recess through the center of the mouth of the recess; and the acute angle causes the longitudinal axis to be inclined towards the mouth of the tubular fluid port which is facing away from the housing.

In one embodiment, the mouth of the recess has a diameter in the range of from 3 to 9 mm, e.g., 5 to 7 mm. In one embodiment, the recess has a depth, measured from the inner wall surface plane of the tubular fluid port, in the range of from 0.5 to 2.0 mm, for instance, 1.0 to 1.9 mm, e.g., 1.5 to 1.8 mm.

In a particular embodiment, the recess has a conical shape with a mouth diameter of 6 mm and a depth of 1.8 mm.

The polyurethane reaction mixture is caused to flow towards a mouth of the tubular housing which has been closed with a potting lid. The reaction mixture accumulates at the closed end, embedding the ends of the bundle of hollow fibers. In one embodiment of the process, the polyurethane reaction mixture is caused to flow towards a mouth of the tubular housing by a centrifugal force generated by rotating the housing around an axis perpendicular to the longitudinal axis of the housing. In a further embodiment, the housing is rotated around an axis which runs through the center of the housing.

In another embodiment of the process, the polyol component and the isocyanate component are dosed simultaneously, but separate from each other, into two recesses provided on the inner wall of two tubular fluid ports present on the outer surface of the tubular housing at equal distance from the mouths of the tubular housing. The components mix in the recesses, forming a polyurethane reaction mixture which is then caused to flow through the respective tubular ports and towards opposite mouths of the tubular housing which have been closed by potting lids. In this embodiment, the tubular housing is rotated around the central axis of the tubular housing, i.e., an axis which is perpendicular to the longitudinal axis of the tubular housing and runs through the center of the tubular housing.

In an embodiment of the process, mixing of the components in the recess is assisted by ultrasound. In one embodiment, a sonotrode is contacting the outside of the tubular fluid port near the bottom of the recess, and ultrasound, for instance, ultrasound having a frequency in the range of from 30 kHz to 50 kHz, is continuously applied during dosing of the liquids.

The present disclosure also provides a device for potting hollow fiber membranes in a diffusion and/or filtration device. The device can be used to perform the potting process of the present disclosure.

The device of the present disclosure comprises two capillaries arranged at an angle relative to one another, the mouths of the capillaries being arranged at a distance from each other. One of the capillaries is connected to a reservoir comprising an isocyanate component, the other capillary is connected to a reservoir comprising a polyol component. Each of the two capillaries is also connected to a metering device for dosing the required amount of polyol component and isocyanate component, respectively, into a tubular fluid port of a housing of a diffusion and/or filtration device.

In one embodiment of the device, the two capillaries foam an angle in the range of from 5° to 30°, for instance, from 10° to 25°, or from 15° to 20°.

In one embodiment of the device, the capillaries have an inner diameter in the range of from 0.5 mm to 2.0 mm, for instance, from 0.8 mm to 1.8 mm, or from 1.3 to 1.7 mm. In one embodiment, both capillaries have the same inner diameter. In another embodiment, the inner diameter of the capillaries is different. In a particular embodiment, the inner diameter of the capillary connected to the reservoir comprising the polyol component is larger than the inner diameter of the capillary connected to the reservoir comprising the isocyanate component. This accounts for the fact that the volumetric flow rate of the polyol component generally will be larger than the volumetric flow rate of the isocyanate component.

Each of the two capillaries is connected to a metering device for dosing the required amount of liquid into a tubular fluid port of the filtration and/or diffusion device. In one embodiment of the device, the metering device is a metering pump. Examples of suitable metering pumps include plunger pumps, membrane pumps, peristaltic pumps, and gear pumps. In one embodiment of the device, the metering pump is a piston pump. In a particular embodiment, the piston is actuated by a pneumatic cylinder. In another embodiment, the piston is actuated by a linear motor. With a linear motor, a much lower start-up, acceleration and damping phase of the liquid jets can be achieved than with a pneumatic cylinder.

The present disclosure also provides a tubular housing of a diffusion and/or filtration device featuring two tubular fluid ports located on the outer wall of the tubular housing at equal distance from the mouths of the tubular housing, the inner wall surface of each of the tubular fluid ports featuring a recess. The recess is used to form a reactive polyurethane mixture from a first stream of an isocyanate component and a second stream of a polyol component.

The tubular housing generally is produced from a thermoplastic polymer, e.g., a polyester, such as polycarbonate or PETG, or a polyolefin, such as polypropylene, by injection molding. In one embodiment, the recesses are introduced into the walls of the tubular fluid ports of the housing during production of the housing by injection molding. In another embodiment, the recesses are introduced after the housing has been produced by injection molding for instance, by drilling, milling, embossing, or heat-forming.

When the polyol component and the isocyanate component are to be simultaneously dosed into both tubular fluid ports of the tubular housing, two of the devices described above are used.

Exemplary embodiments of the apparatus and the process of the present disclosure are shown in the accompanying figures and are described below. It will be understood that the features mentioned above and those described hereinafter can be used not only in the combination specified but also in other combinations or on their own, without departing from the scope of the present invention.

FIG. 1 is a schematic front view of a tubular fluid port 10 of the present disclosure featuring a recess 11 on its inner wall surface. A first capillary 20 for dosing a polyol component 23 into the tubular fluid port 10 is connected to a metering device 21 and a reservoir 22 for a polyol component. A second capillary 30 for dosing an isocyanate component 33 into the tubular fluid port 10 is connected to a metering device 31 and a reservoir 32 for an isocyanate component. As symbolized in the figure, a jet 23 of the polyol component is ejected from the first capillary 20; and a jet 33 of the isocyanate component is ejected from the second capillary 30. The jets 23, 33 meet in the recess 11 in the wall of the tubular fluid port 10 and form a reaction mixture which yields a polyurethane. The reaction mixture flows through the tubular fluid port 10 into the housing of the filtration and/or diffusion device and is transported towards an end of the housing by centrifugal forces.

Figure 2:
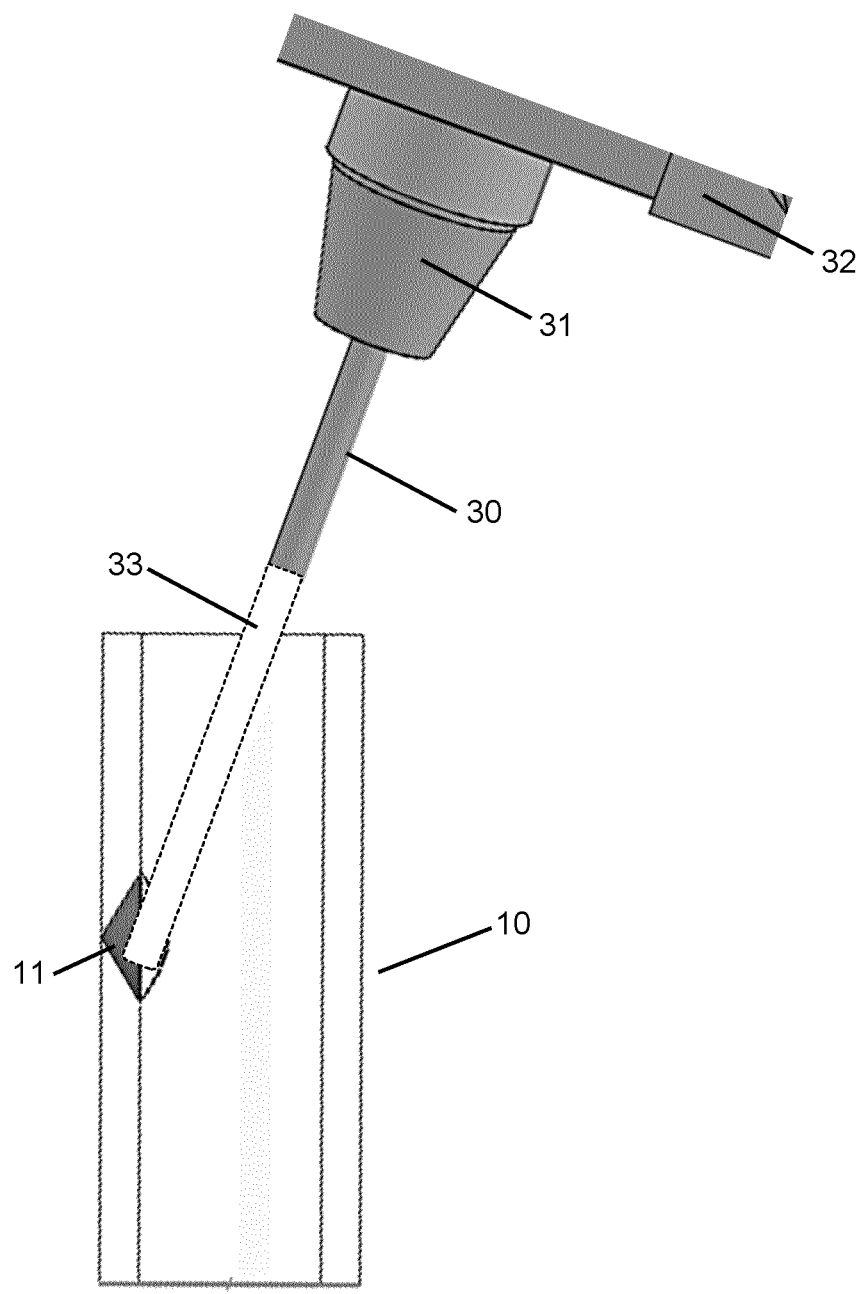
FIG. 2 is a schematic side view of a tubular fluid port of the present disclosure featuring a recess on its inner wall surface; and of a capillary for dosing a polyurethane component into the tubular fluid port.

FIG. 2 is a schematic side view of a tubular fluid port 10 of the present disclosure featuring a recess 11 on its inner wall surface. A capillary 30 for dosing an isocyanate component 33 into the tubular fluid port 10 is connected to a metering device 31 and a reservoir 32 for an isocyanate component. As symbolized in the figure, a jet 33 of the isocyanate component is ejected from the capillary 30. The jet 33 of the isocyanate component is directed into the recess 11, where the jet 33 of the isocyanate component is mixed with a jet of a polyol component (not shown).

Figure 3:
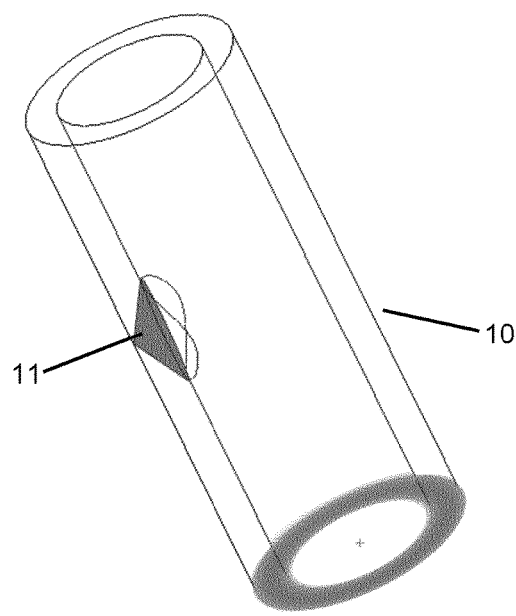
FIG. 3 is a schematic perspective view of a tubular fluid port of the present disclosure featuring a recess on its inner wall surface.

FIG. 3 is a schematic perspective view of a tubular fluid port 10 of the present disclosure featuring a conical recess 11 on its inner wall surface.

Figure 4:
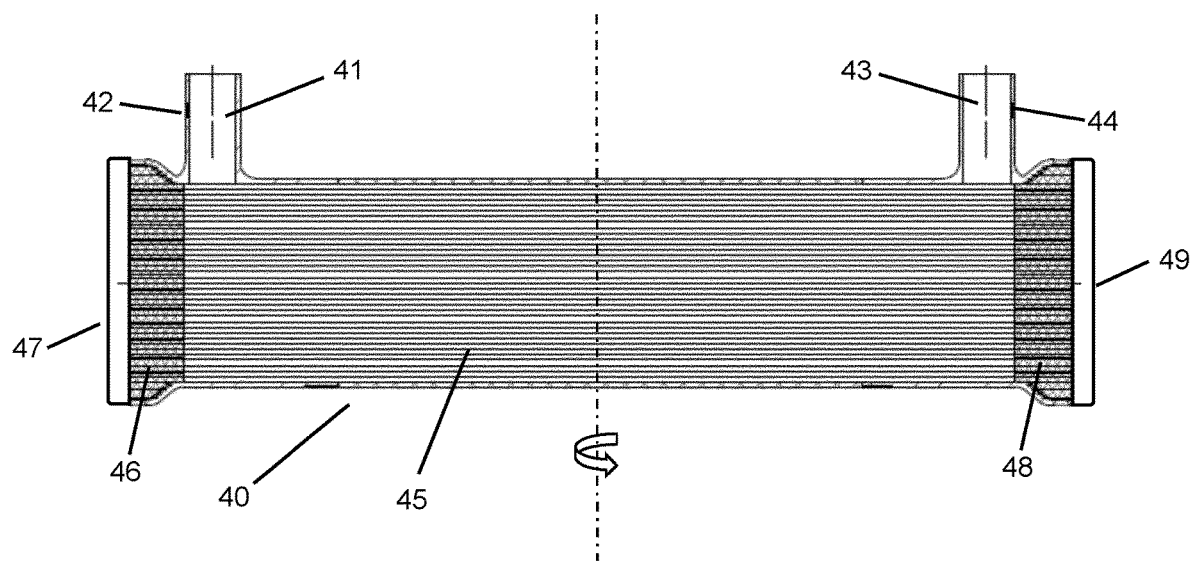
FIG. 4 is a schematic longitudinal sectional view of a housing of a filtration- and/or diffusion device of the present disclosure.

FIG. 4 is a schematic longitudinal sectional view of a tubular housing 40 of a filtration- and/or diffusion device of the present disclosure. The housing 40 features two tubular fluid ports 41, 43, each featuring a recess 42, 44 on its inner wall surface. The fluid ports 41, 43 are located near opposite ends of the housing 40, at equal distance from the center of the housing 40. Both fluid ports 41, 43 also are located at equal distance from the mouths of the tubular housing 40. In the embodiment shown in the figure, the fluid ports 41, 43 are located on the same side of the housing 40, and their longitudinal axes lie in a common plane. A bundle 45 of hollow fiber membranes is disposed inside the housing 40, and the mouths of the housing 40 are sealed by potting lids 47, 49. During the potting process of the present disclosure, a polyol component and an isocyanate component are dosed into the recesses 42, 44 of the tubular fluid ports 41, 43, where they mix and foam a polyurethane reaction mixture. As symbolized in the figure, the housing 40 is rotated around a central axis perpendicular to its longitudinal axis. The polyurethane reaction mixture flows into the housing 40 and is transported towards the ends of the housing 40 by centrifugal force. The polyurethane reaction mixture sets and solidifies at the mouths of the housing, forming end walls 46, 48 comprised of polyurethane. The potting lids 47, 49 are subsequently removed and the ends of the bundle 45 of hollow fiber membranes are cut off to re-open the hollow fiber membranes.

LIST OF REFERENCE SIGNS

10 tubular fluid port
11 recess
20 first capillary
21 metering device
22 polyol component reservoir
23 polyol component jet
30 second capillary
31 metering device
32 isocyanate component reservoir
33 isocyanate component jet
40 tubular housing
41 tubular fluid port
42 recess
43 tubular fluid port
44 recess
45 bundle of hollow fiber membranes
46 end wall/potting zone
47 potting lid
48 end wall/potting zone
49 potting lid

The invention claimed is:

1. A process for potting hollow fiber membranes in a diffusion and/or filtration device comprising a tubular housing with a bundle of hollow fiber membranes arranged therein and at least one tubular fluid port located on the outer wall surface of the tubular housing, the process comprising the steps of
   a) dosing simultaneously, but separate from each other, a polyol component and an isocyanate component into a recess provided on an inner wall of the at least one tubular fluid port;
   b) allowing the polyol component and the isocyanate component to mix in the recess, forming a polyurethane reaction mixture;
   c) causing the polyurethane reaction mixture to flow towards a mouth of the tubular housing which has been closed with a potting lid; and to embed the ends of the bundle of hollow fibers in the polyurethane reaction mixture; and
   d) allowing the polyurethane reaction mixture to cure and form a solid potting zone sealing the mouth of the tubular housing.

2. The process of claim 1, wherein causing the polyurethane reaction mixture to flow towards a mouth of the tubular housing involves rotating the tubular housing around an axis perpendicular to the longitudinal axis of the tubular housing.

3. The process of claim 2, wherein the tubular housing is rotated around an axis which runs through the center of the tubular housing.

4. The process of claim 3, wherein the recess has a conical shape.

5. The process of claim 2, wherein the recess has a conical shape.

6. The process of claim 1, wherein the recess has a conical shape.

7. The process of claim 6, wherein the mouth of the recess has a diameter in the range of from 5 to 7 mm.

* * * * *